(12) United States Patent
Gold (10) Patent No.: US 7,064,312 B2
(45) Date of Patent: Jun. 20, 2006

(54) DEVICE FOR GENERATING ELECTROMAGNETIC WAVES, METHOD FOR OPERATING A DEVICE OF THIS TYPE AND METHOD FOR MODULATING THE ELECTROMAGNETIC WAVES TO BE GENERATED USING A DEVICE OF THIS TYPE IN ACCORDANCE WITH DATA TO BE TRANSMITTED

(75) Inventor: Peter Gold, Sinzing (DE)

(73) Assignee: Siemens Aktiengesellschaft, Munich (DE)

( * ) Notice: Subject to any disclaimer, the term of this patent is extended or adjusted under 35 U.S.C. 154(b) by 240 days.

(21) Appl. No.: 10/694,112

(22) Filed: Oct. 27, 2003

(65) Prior Publication Data

US 2004/0114402 A1 Jun. 17, 2004

(30) Foreign Application Priority Data

Oct. 29, 2002 (DE) ................................. 102 50 396

(51) Int. Cl.
*H01J 40/14* (2006.01)

(52) U.S. Cl. ................................. 250/214 R; 250/214.1

(58) Field of Classification Search ............ 250/214 R, 250/214.1
See application file for complete search history.

(56) References Cited

U.S. PATENT DOCUMENTS 3,700,846 A * 10/1972 Ishikawa et al. ............. 219/723
4,104,561 A * 8/1978 Iwata ........................ 315/101

* cited by examiner

*Primary Examiner*—Que T. Le
(74) *Attorney, Agent, or Firm*—Baker Botts L.L.P.

(57) ABSTRACT

A device is provided for generating electromagnetic waves, in particular for data transfer between a vehicle and a data storage medium, whereby a choke coil (30) is provided between at least one part of an energy supply device (1, 40, 41, 42) and an oscillating circuit (6). The device provides short build-up and decay times for the resonant oscillation of the oscillating circuit (6). Furthermore, a method is provided for operation of the device, whereby the choke coil (30) is operated in the saturation state at times during the transient condition of the oscillating circuit (6). The device can be used for modulating electromagnetic waves to be generated in accordance with data to be transmitted.

17 Claims, 13 Drawing Sheets

DEVICE FOR GENERATING ELECTROMAGNETIC WAVES, METHOD FOR OPERATING A DEVICE OF THIS TYPE AND METHOD FOR MODULATING THE ELECTROMAGNETIC WAVES TO BE GENERATED USING A DEVICE OF THIS TYPE IN ACCORDANCE WITH DATA TO BE TRANSMITTED

PRIORITY

This application claims foreign priority of the German application DE 10250396.6 filed on Oct. 29, 2002.

TECHNICAL FIELD

The invention relates to a device for generating electromagnetic waves, a method for operating a device of this type and a method for modulating the electromagnetic waves to be generated using a device of this type in accordance with data to be transmitted.

BACKGROUND OF THE INVENTION

In recent times, access control systems for motor vehicles, such as the PASE system (Passive Start and Entry System) for example, have enjoyed widespread application. In this situation, systems of this type send electromagnetic waves on an inductive basis for data transmission between a motor vehicle and a data storage medium.

Figure 1:
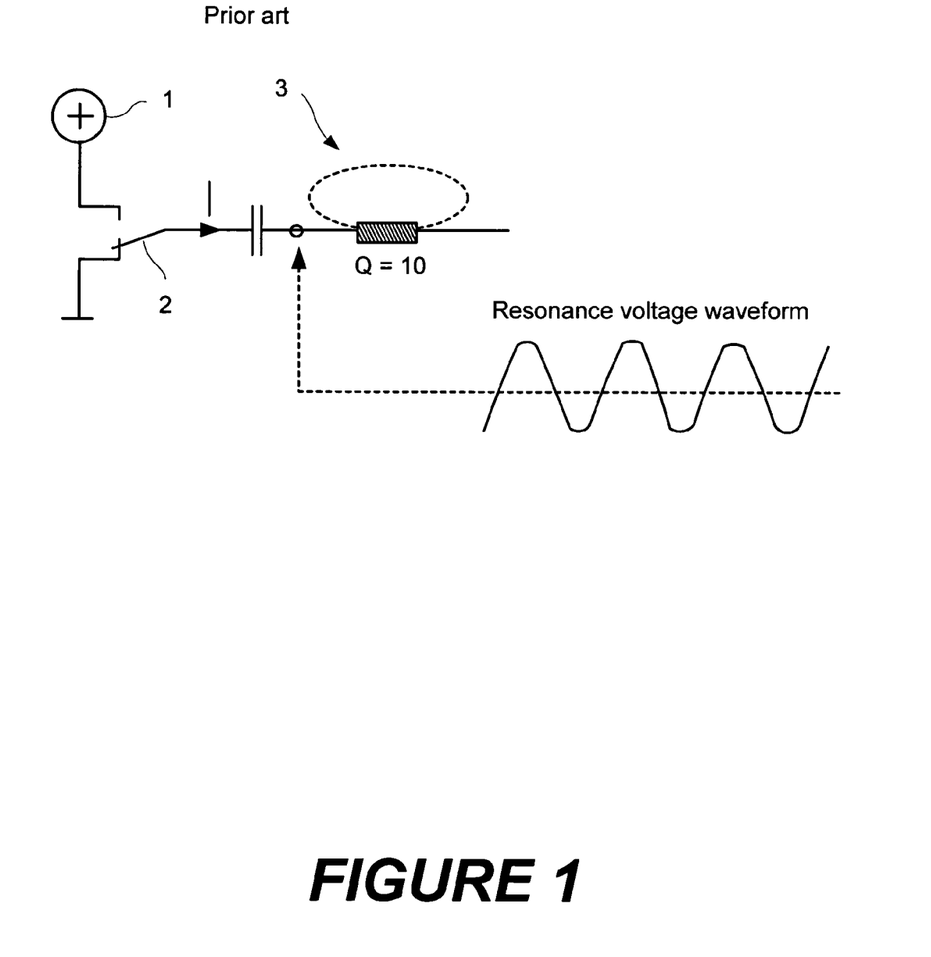
FIG. 1 shows a known device for generating electromagnetic waves.

A known device for this purpose is shown in FIG. 1. In this case, a series resonance circuit 3 is supplied by way of a terminal or switch 2 which can be switched between two voltage levels with a square-wave voltage which corresponds to the resonant frequency of the resonance circuit 3. As a result of the resonance characteristics of the oscillating circuit, a resonance voltage can be achieved in this situation by way of a transmitting coil of the resonance circuit 3, which resonance voltage corresponds to a multiple of the voltage level of the DC voltage source 1.

Figure 2:
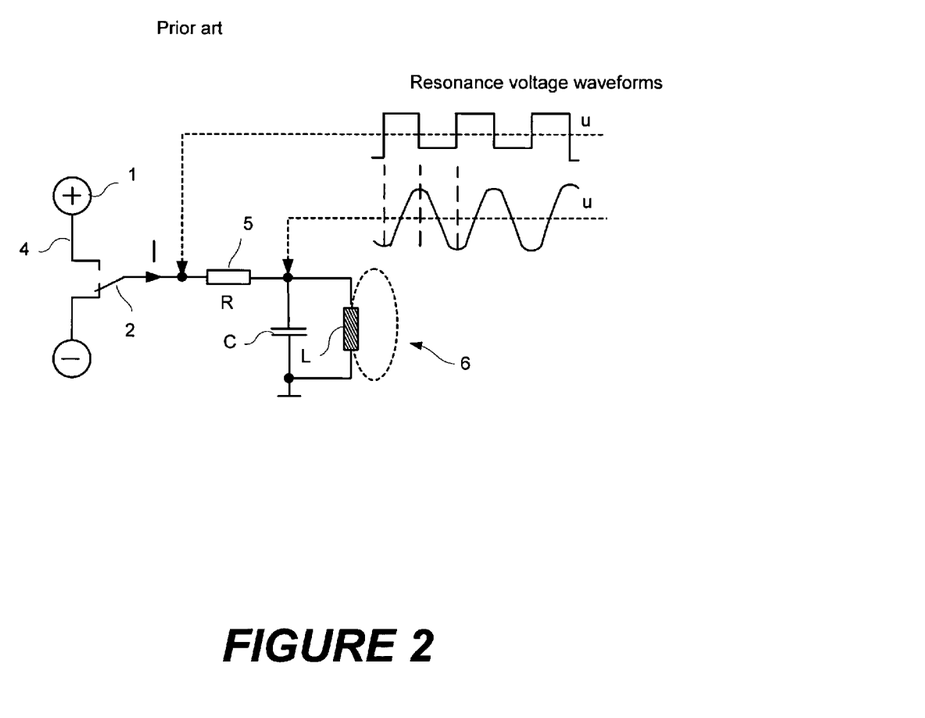
FIG. 2 shows a further known device for generating electromagnetic waves.

In addition, as shown in FIG. 2, it is also known for a parallel resonance circuit 6 to be controlled by means of a square-wave alternating voltage using a capacitor C and a coil L via a resistor 5. In this situation, the square-wave alternating voltage is delivered to the resistor 5 by way of a terminal 2 which can be switched between two voltage potentials of a direct current source 4. In this situation, the switching frequency at the switchable terminal 2 corresponds to the natural frequency of the resonance oscillating circuit 6.

Figure 3:
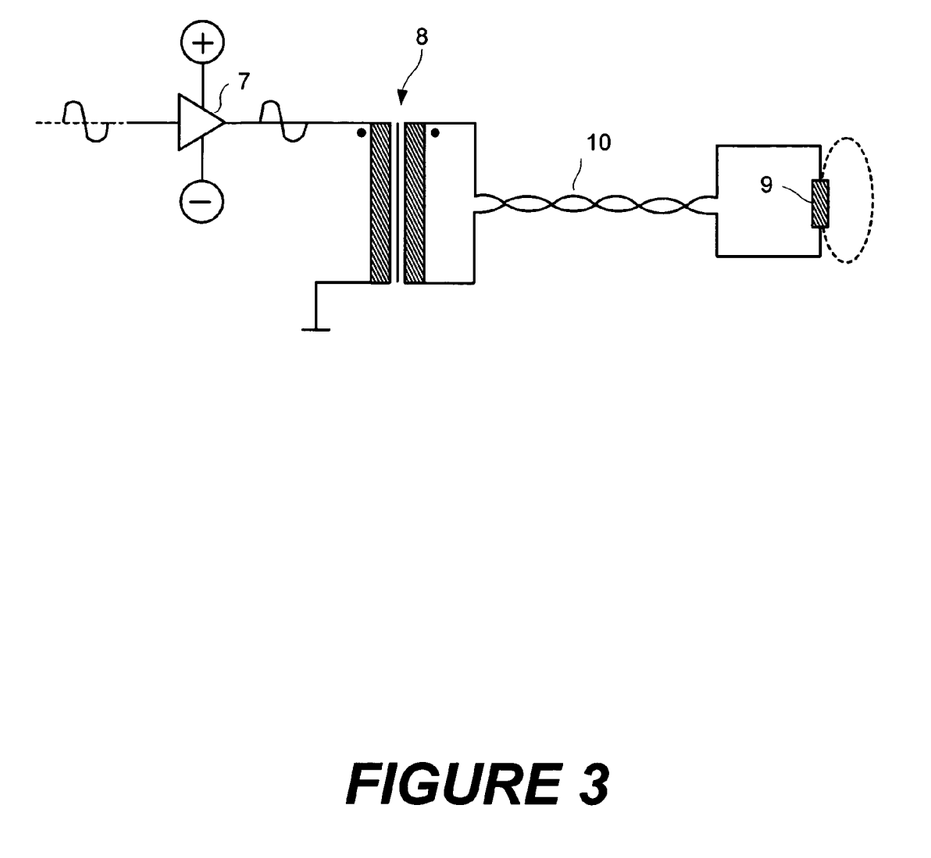
FIG. 3 shows a further known device for generating electromagnetic waves.

A further known device for generating electromagnetic waves is shown in FIG. 3. In this situation, an alternating voltage source 7 supplies a transformer 8 with a sine-wave voltage characteristic. The transformer 8 increases the input voltage and outputs it by way of a twisted cable 10 to a transmitting coil 9. As a result of the increased voltage at the terminals of the transmitting coil 9, their operating current is reduced. Losses on the feeder cable to the transmitting coil 9 are reduced as a result. Consequently, as a result of using the transformer 8, a spatial separation can be achieved between the alternating voltage source 7 as the power output stage and the transmitting coil 9.

SUMMARY OF THE INVENTION

The object of the invention is to provide an improved device for generating electromagnetic waves, which in particular delivers a high output power with an optimized level of efficiency, a method for operating such a device, and a method for modulating the electromagnetic waves to be generated using a device of this type in accordance with data to be transmitted.

This object can be achieved by a device for generating electromagnetic waves, in particular for data transfer between a motor vehicle and a data storage medium, comprising an energy supply device for providing an alternating voltage, an oscillating circuit to which the alternating voltage is applied for generating the electromagnetic waves, and a choke coil between at least one part of the energy supply device and the oscillating circuit.

The energy supply device can have a terminal capable of being switched over between two voltages which is connected through the choke coil to an oscillating circuit terminal. The energy supply device may have a further terminal capable of being switched over between two voltages which is connected through a capacitor or a transmitting coil of the oscillating circuit to the one oscillating circuit terminal.

The energy supply device may contain a DC voltage source, a converter coil and two push-pull switches, the DC voltage source is connected by way of the choke coil to an inner tapping point of the converter coil whose outer tapping points are connected in each case to one of the push-pull switches which assume switching states in push-pull fashion, and the output voltage from the outer tapping points of the converter coil is applied to the oscillating circuit. The converter coil may be formed by an autotransformer. A switch can be provided between the DC voltage source and the choke coil such that in the event of simultaneous closure of the push-pull switches and opening of the switch the oscillation of the oscillating circuit decays abruptly. The push-pull switches can be switched in tune to the natural frequency of the oscillating circuit, the switch is switched in tune to the switching frequency of the push-pull switches and is operated with a selectable pulse width. A terminal can be provided between the switch and the choke, to which is connected a free-wheeling diode. One terminal side of a diode can be connected between the choke coil and the inner terminal of the converter coil and the other terminal side of the diode is connected to the DC voltage source. The device may additionally comprise a transformer, having a primary coil and a secondary coil which are coupled magnetically, whereby the primary coil is connected to the outer tapping points of the converter coil and one output of the secondary coil is connected to the one oscillating circuit terminal and the other output of the secondary coil is connected by way of a capacitor or a transmitting coil of the oscillating circuit to the one oscillating circuit terminal. The converter coil can be the primary coil of a transformer, and one output of the secondary coil of the transformer, which is magnetically coupled to the primary coil, can be connected to the one oscillating circuit terminal and the other output is connected by way of a capacitor or a transmitting coil of the oscillating circuit to the one oscillating circuit terminal.

The object can also be achieved by a method for operating a device for generating electromagnetic waves comprising the steps of:
providing an DC voltage by an energy supply device;
applying the DC voltage to an oscillating circuit for generating the electromagnetic waves;
coupling a choke coil between at least one part of the energy supply device and the oscillating circuit; and
operating the choke coil in the saturation state at times during the transient condition of the oscillating circuit.

The step of providing the DC voltage can be performed in accordance with data to be transmitted, and may include the step of switching between two voltages at a frequency tuned to the natural frequency of the oscillating circuit in order to identify a high level state or a low level state relating to the data to be transmitted.

The object can also be achieved by a method for operating a device for generating electromagnetic waves comprising the steps of:

providing an DC voltage by an energy supply device;

switching the DC voltage to an inner tapping point of a converter coil;

coupling the outer tappings of the converter coil with an oscillating circuit; wherein the switching and coupling can be performed in such a way that the oscillating circuit decays abruptly.

The abrupt decay can be reached by decoupling of the inner tapping point and grounding of the outer tapping point. The switching may close while a particular data state obtains or is operated tuned to the natural frequency of the oscillating circuit with a selectable pulse width. A pulse width of the switching can be determined depending on the data to be transmitted.

BRIEF DESCRIPTION OF THE DRAWINGS

Preferred embodiments of the invention will be described in the following with reference to the drawings. In the drawings.

DETAILED DESCRIPTION OF THE PREFERRED EMBODIMENTS

The first embodiment of the invention will be described in the following with reference to FIG. 4.

Figure 4:
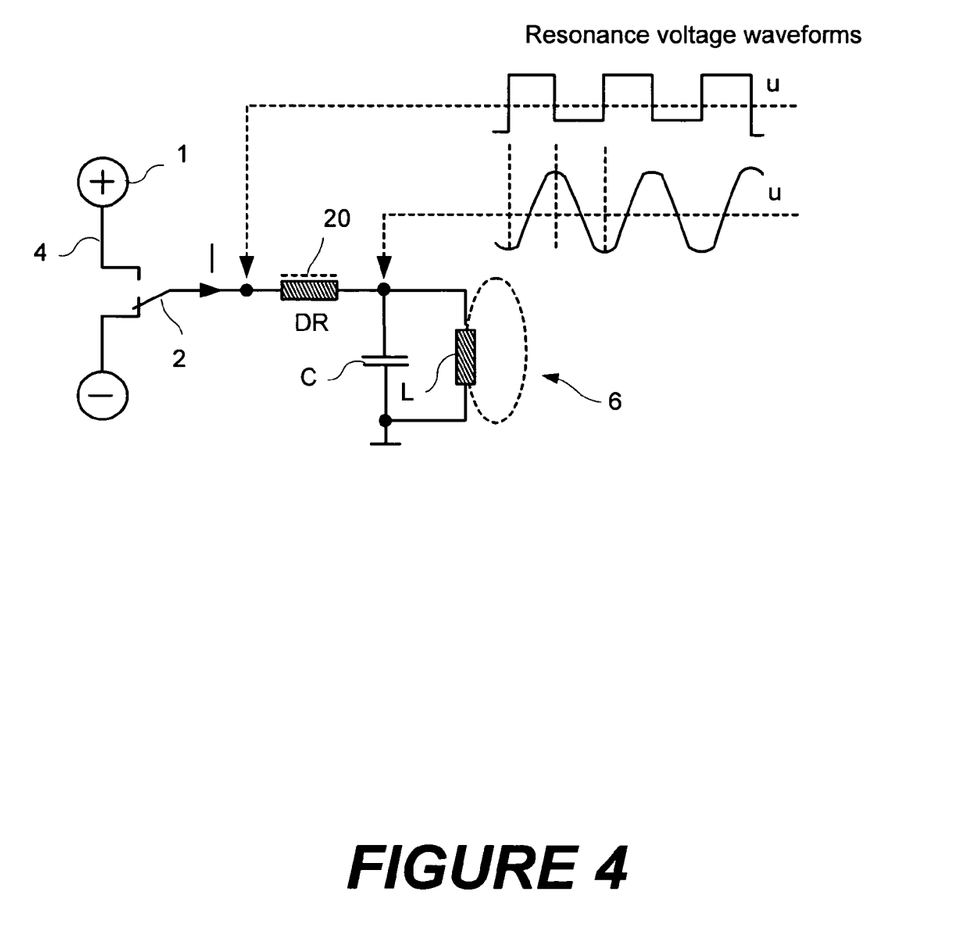
FIG. 4 shows a device for generating electromagnetic waves as a first embodiment of the invention.

According to the arrangement represented in FIG. 4, the device contains a DC voltage source 4 with one positive and one negative voltage terminal. A switch 2 is connected alternately to one of the two voltage outputs of the DC voltage source 4. In addition, the device contains a choke coil 20 and also a coil L and a capacitor C which form a parallel current circuit or oscillating circuit 6. The oscillating circuit 6 has two oscillating circuit terminals, one of which is connected to ground and the other of which is connected to one end of the choke 20. The choke coil 20 is connected by way of its other end to the switch 2.

During operation, the switch 2 switches between the two voltage terminals of the DC voltage source 4 at a switching frequency which is tuned to the resonant frequency of the oscillating circuit 6. By preference it switches at a frequency which corresponds approximately or precisely to the resonant frequency of the oscillating circuit 6. If the switch 2 remains switched continuously over an extended duration, for example several period durations of the natural frequency of the oscillating circuit at one voltage output of the DC voltage source 4, the energy storage elements C, L, 20 deliver their stored energy by means of discharging. If the switch 2 begins to perform a switchover operation from such a state in the region of the natural frequency of the oscillating circuit 6, a high proportion of the voltage initially drops at the coil 20 and the oscillating circuit is gradually excited to oscillate at the resonant frequency. The duration of the transient condition of the oscillating circuit 6, in other words the length of time from the beginning of the switchover operation of the switch 2 until the oscillating circuit 6 attains the resonant oscillation state is determined essentially by the inductance of the choke 20. At the same time, the choke coil 20 effects a certain decoupling in respect of voltage between the voltage source 4 and the oscillating circuit 6. In this situation, the choke 20 enables a load, namely the oscillating circuit which operates with a sine-wave voltage, to be coupled with a generation unit 2, 4 which outputs a square-wave voltage. In this manner, the resonant oscillating circuit 6 can have a voltage characteristic which differs from the input square-wave voltage characteristic. In the concrete situation, the parallel oscillating circuit 6 generates a sine-wave voltage characteristic.

The device has the advantage that the square-wave input voltage used can be generated in a more simple and more efficient manner as compared with a sine-wave alternating voltage as a result of the interaction of a DC voltage source 4 and a changeover switch 2.

The voltage input by way of the choke 20 is magnified by the parallel oscillating circuit 6. As a result, the output power of the transmitting coil L increases.

FIG. 4 shows voltage waveforms between the switch 2 and the choke 20 and also between the choke 20 and the oscillating circuit 6 of the circuit used.

In this situation it should be noted that while the voltage levels of the positive voltage terminal and of the negative voltage terminal of the direct current source 4 can basically assume any desired values; they must simply exhibit a certain voltage difference.

It should also be noted that the choke 20 is advantageously a choke having a core comprising magnetizable material. This means that the inductance of the choke can be increased. The magnetizability of the core is however limited. As the strength of the magnetic field increases, the core has a progressively diminishing effect on the inductance of the choke. Once the field strength reaches a certain level, the core is in a state of magnetic saturation in this situation. If the current flow of the coil increases further, only the inductance of the winding of the choke coil then continues to have an effect. In the saturation range, this means that the coil with its core exhibits a decreasing inductance as the current flow through its winding increases.

As an alternative to the aforementioned embodiment an inductance element is used by preference for the choke coil 20, in other words a coil having a core comprising magnetizable material, whose nominal operating current for its specified inductance value is less than the current flow through the choke coil 20 during the transient condition or build-up process in the parallel resonance circuit 6. The choke coil 20 is therefore selected such that during the build-up process or transient condition in the parallel resonance circuit 6 it reaches the saturated state for a certain part of the transient condition, in other words it is used outside its standard operating range. During the build-up process in the parallel resonance circuit 6, only a reduced inductance brought about by the saturation process in the core of the choke coil 20 thus has an effect in the device according to the first embodiment. During the transient condition the choke coil should thus be considered to be "low-resistance". Consequently the parallel resonance circuit is charged with a relatively high current in a short time and attains its resonant oscillatory response after a short time.

During the resonant oscillatory response of the parallel resonance circuit 6, only a low trickle charge flows by way of the choke coil 20, however, which compensates for the losses caused by the current flow in the device. With the reduced current flow, the choke coil 20 returns to the unsaturated range and acts on the device with its inductance in the nominal operating range. A choke of this type is referred to in the following as "self-regulating inductance" or "self-regulating choke".

Figure 5:
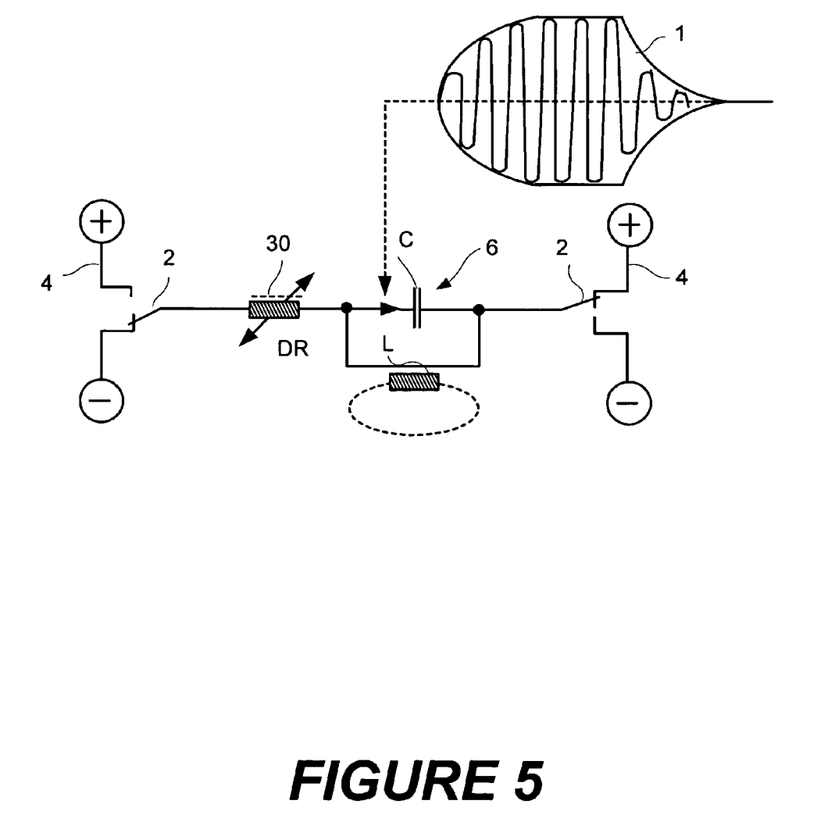
FIG. 5 shows a device for generating electromagnetic waves as a second embodiment of the invention.

FIG. 5 shows a further device for generating electromagnetic waves according to a second embodiment of the invention. Similar to the device according to the first embodiment of the invention, the device contains the parallel oscillating circuit 6 and also the DC voltage source 4 and the switch 2. In addition, the device contains the self-regulating choke coil 30 and also a further DC voltage source 4 with a further switch 2. The DC voltage sources 4 and switches 2 are preferably of the same design in this situation. The switch 2 is connected alternately to one positive voltage terminal and to one negative voltage terminal of the DC voltage source 4. The other switch 2 is connected by way of the parallel configuration of the parallel oscillating circuit 6 to the choke coil 30. The two switches 2 perform their switchover between the respective positive and negative voltage terminals of the DC voltage sources 4 in push-pull fashion with respect to one another. In this situation, a switchover takes place in each case at a frequency which is tuned to the natural frequency of the parallel resonance circuit and preferably matches the latter.

The device thus provides for full bridge control of the parallel resonance circuit 6. In this manner, the antenna current of the transmitting coil L is doubled and is increased in accordance with said coil's output power.

Figure 6:
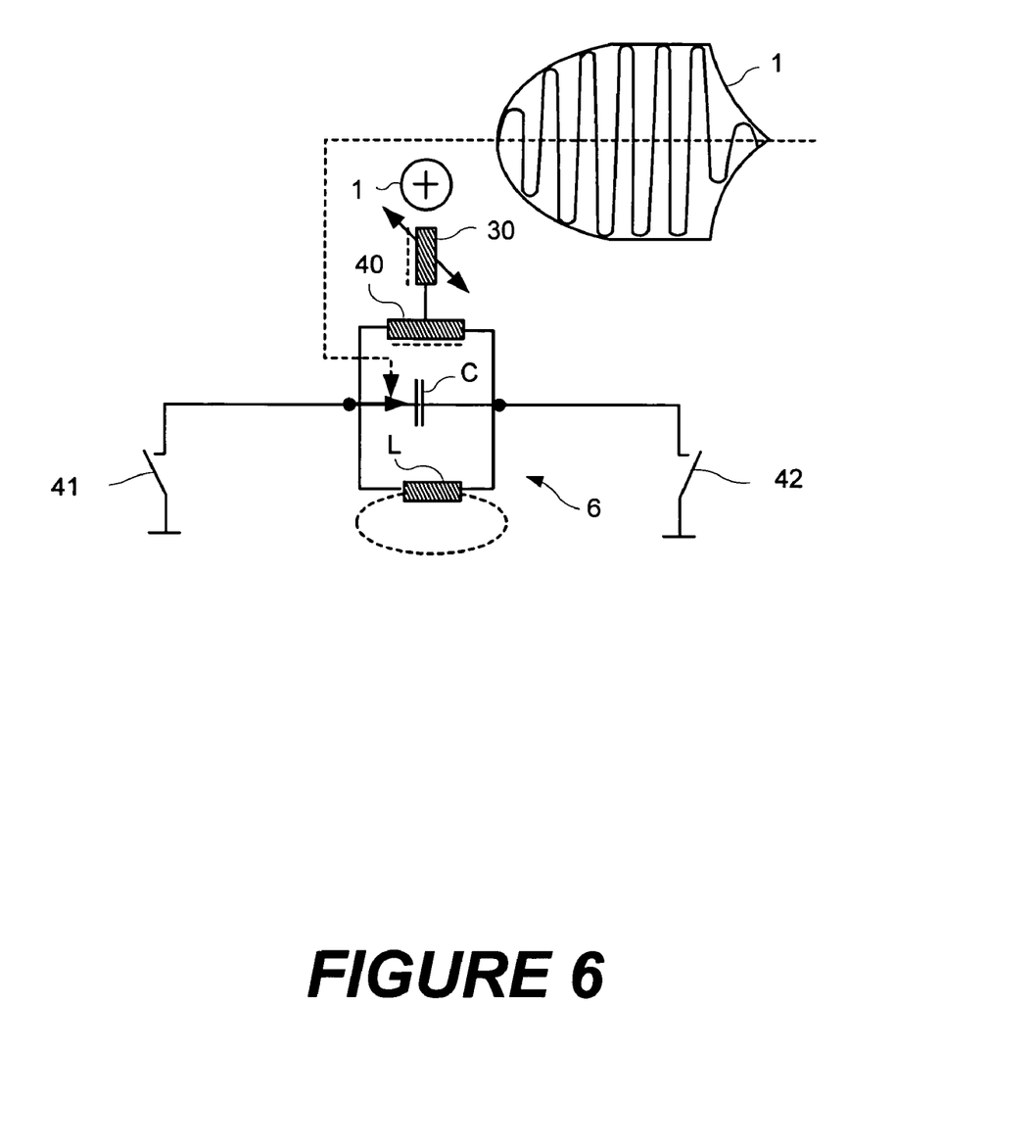
FIG. 6 shows a device for generating electromagnetic waves as a third embodiment of the invention.

FIG. 6 shows a further device for generating electromagnetic waves according to a third embodiment of the invention. Similar to the aforementioned second embodiment, the third embodiment contains the parallel oscillating circuit 6 and also the self-regulating choke coil 30. In addition, the device according to the third embodiment contains the DC voltage source 1, a converter coil 40 and also a switch 41 and a switch 42.

The choke coil 30 is connected at one end to a positive voltage terminal of the DC voltage source 1. In addition, the choke coil 30 is connected at its other end to an inner tapping point of the converter coil 40. Each outer tapping point of the converter coil 40 is connected to an oscillating circuit terminal of the oscillating circuit 6. Each of the outer tapping points of the converter coil 40 is moreover connected to one of the switches 41 and 42.

In this situation, the converter coil 40 preferably takes the form of an autotransformer.

The operating principle of the device is described in the following. In the initial state, the two switches 41 and 42 are to be regarded as open. In this situation, the energy storage elements 30, 40, C, L in the circuit are discharged. In order to excite an oscillation in the parallel resonance circuit 6, the switches 41 and 42 switch through in push-pull fashion at a frequency which is tuned to the resonant frequency of the parallel resonance circuit 6, where both frequencies preferably match. In the further course of the process, the oscillation of the parallel resonance circuit 6 can again be made to decay by opening the two switches 41 and 42.

In order to reduce the duration of decay of the oscillation of the oscillating circuit 6, it is however also possible to close the two switches 41 and 42 at the same time. As a result, the energy stored in the energy storage elements of the circuit is discharged directly to ground. The simultaneous closure of the switches 41 and 42 thus results in a short-circuit discharge of the parallel oscillating circuit. In this situation, the decay time of the resonant oscillation of the oscillating circuit 6 is determined principally by the resistance of the switches 41 and 42.

The circuit additionally offers the advantage that the switches 41 and 42 are provided on the low potential side, preferably with one end connected to ground. This facilitates the technical implementation of the switches 41 and 42 in circuitry terms. With the switches 41 and 42 being connected to ground, these can be controlled directly by means of a control electronics unit.

A further advantage of the device according to the third embodiment lies in the doubling of the antenna current of the transmitting coil L when compared to the device according to the second embodiment.

In addition, the switches 41 and 42 can be used for power control by means of pulse width modulation, which in the last analysis is only made possible by means of the aforementioned choke—similar to a switch-mode power supply. In principle, it is irrelevant in this situation whether data or a continuous wave is being transmitted.

Figure 7:
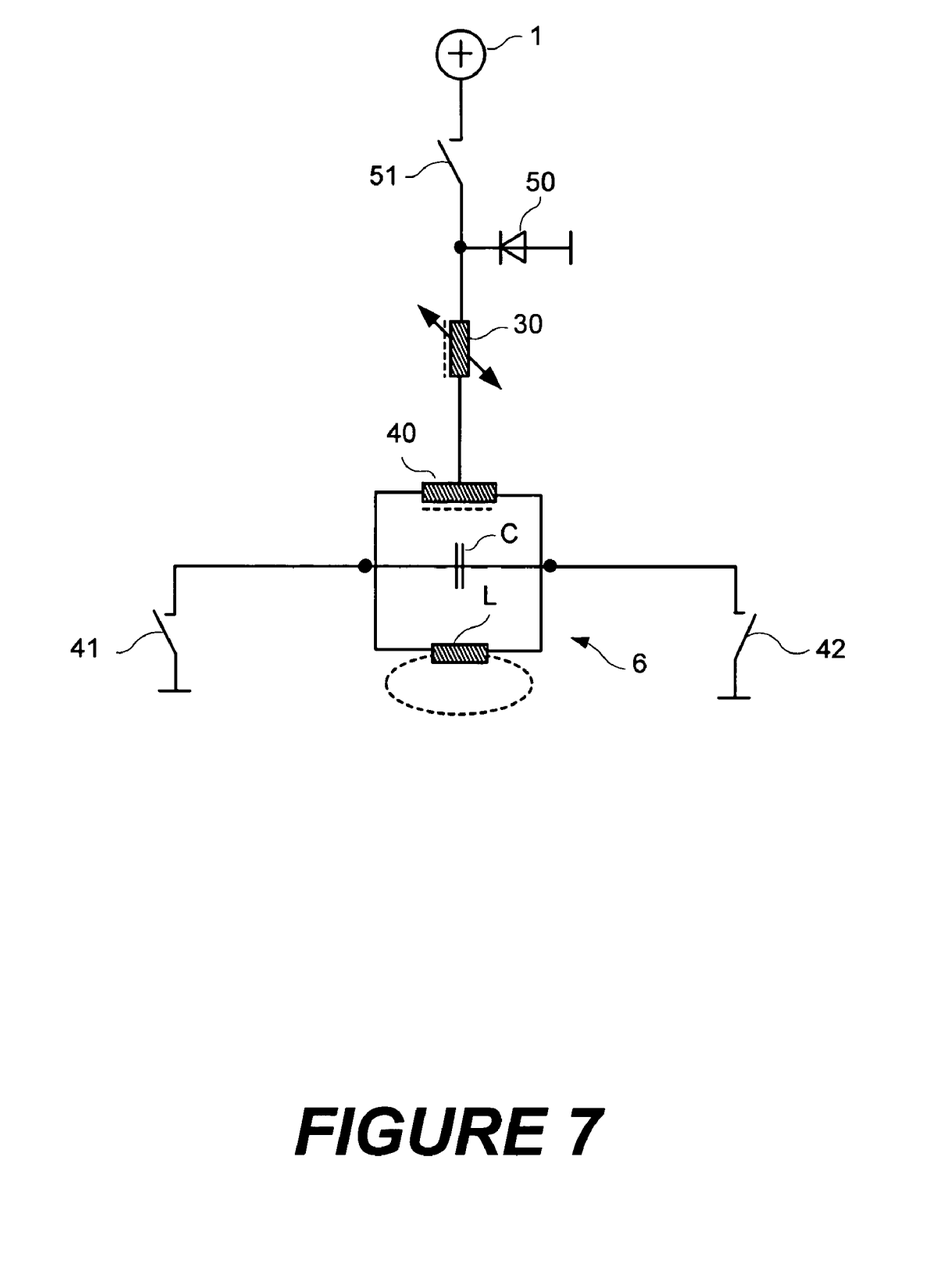
FIG. 7 shows a device for generating electromagnetic waves as a fourth embodiment of the invention.

FIG. 7 shows a further device for generating electromagnetic waves according to a fourth embodiment of the invention.

The device is identical to the device according to the third embodiment, except that it is additionally equipped with a diode 50 and also a switch 51.

The switch 51 is inserted between the choke coil 30 and the positive voltage terminal of the DC voltage source 1. Furthermore, the diode 50 is connected on the cathode side between the switch 51 and the choke coil 30 and also on the anode side to a low potential, preferably to ground.

The operating principle of the device according to the fourth embodiment is basically identical to that of the third embodiment, whereby the parallel oscillating circuit 6 is only supplied with a voltage when the switch 51 is closed.

The switch 51 can thus be used for power control by means of pulse width modulation. In this situation, the switch 51 remains permanently closed while the parallel resonance circuit 6 is in an oscillating state, which generates maximum output power in the transmission coil L, or it remains closed with a selectable pulse width in each case. By preference, switching of the switch 51 is coordinated in time with the through-switching of the switches 41 and 42.

In this case, it is preferably switched at twice the frequency of the oscillation frequency of the parallel oscillating circuit 6. In this situation, the switch 51 switches through alternately at the same point in time with one of the switches 41, 42. For the purposes of pulse width modulation it interrupts the connection before the relevant switch 41 and 42 terminates its through-switched state. Pulse width modulation can be achieved in this manner by means of the switch 51 for power control of the output power of the transmitting coil L.

With regard to a power control device of this type effected by the switch 51, the current flow must be maintained in order to avoid undesired induction voltages caused by the switch 51 at the choke coil 20. This is achieved by the free-wheeling diode D1.

With regard to a power control device by means of pulse width modulation through the switch 51, the condition can occur whereby in the case of a low output power, in other words in the case of a small pulse width, the choke 30 does not reach saturation. In this case, the parallel oscillating circuit 6 for transmitting data bits oscillates not exponentially but in linear fashion. When transmitting data bits of differing length, such as for example in the case of the Manchester code, this has the result that the data bits having a greater length exhibit a greater amplitude when compared with the data bits having a smaller length.

In order to obtain a consistent amplitude regardless of the length of a data bit, a control device is optionally employed for the device which checks the length of the data bits and allocates short data bits a predefined minimum pulse width of the switch 51, which guarantees an exponential rise time for the parallel oscillating circuit 6. Consequently, the parallel oscillating circuit 6 for transmitting narrow bits is excited with a greater pulse width than is the case for wide bits. The control device is preferably implemented by means of software.

As an alternative or an addition, a control device can be implemented by means of hardware, whereby pulse width modulation control for the switch 51 is bridged for a certain time by way of a monoflop and full power, in other words full pulse width, is applied to the parallel oscillating circuit 6 until the oscillating circuit 6 has built up to a particular level of oscillation. From this point in time, pulse width modulation for controlling the switch 51 is then activated again and results in a further rise in the oscillation amplitude of the oscillating circuit 6.

The aforementioned control facilities can similarly be used to control each of the switches 41 and 42 instead of the switch 51 to achieve pulse width modulation in the device according to the third embodiment.

In order to achieve a short decay time for the resonant oscillation of the oscillating circuit 6, the switches 41, 42 are closed at the same time, similar to the third embodiment. The switch 51 is open during this time. A connection between the energy source 1 and ground is thus prevented.

Figure 8:
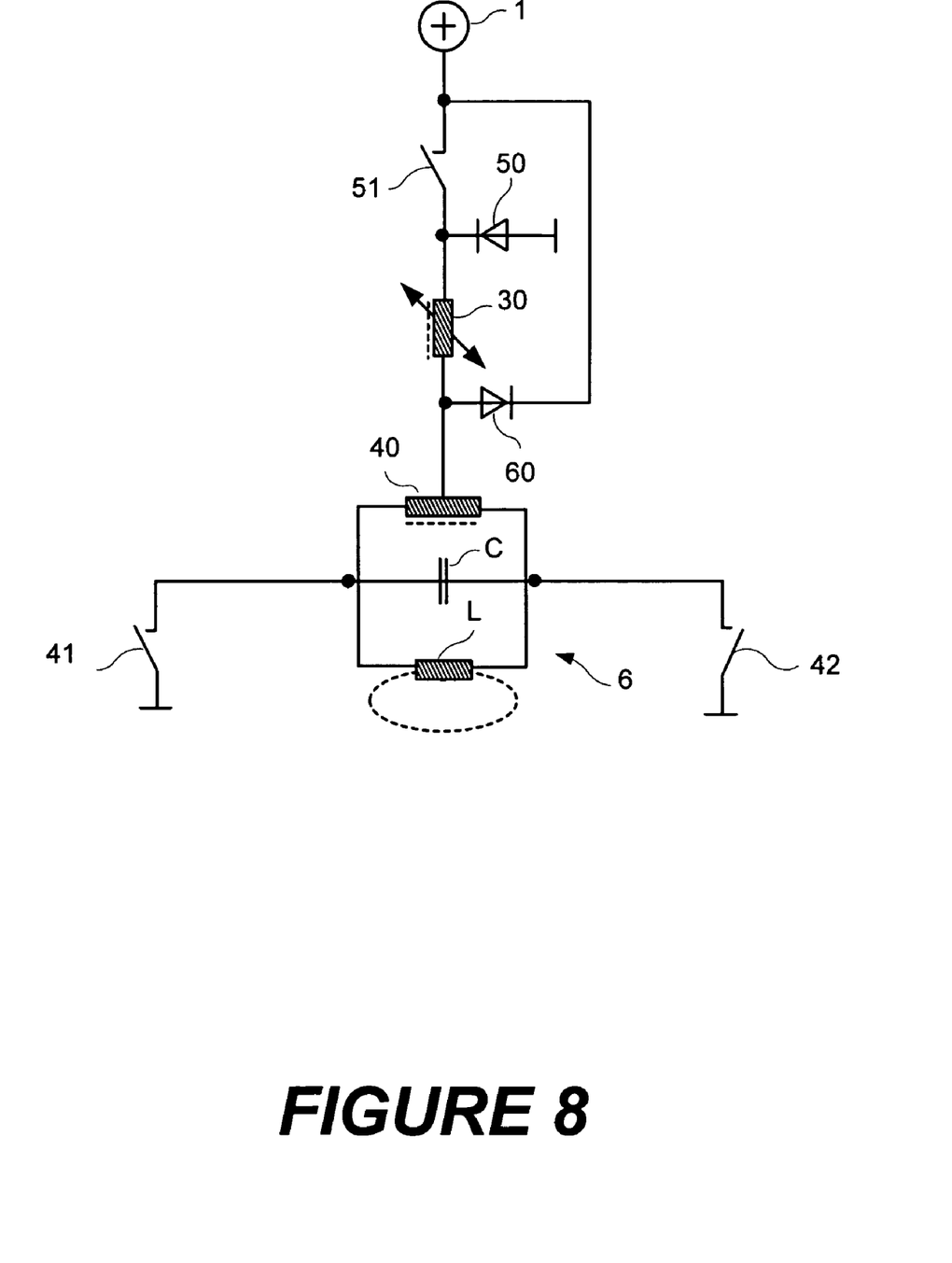
FIG. 8 shows a device for generating electromagnetic waves as a fifth embodiment of the invention.

FIG. 8 shows a device for generating electromagnetic waves according to a fifth embodiment of the invention.

The device according to the fifth embodiment is identical to that of the fourth embodiment, except that it additionally contains a diode 60. The diode 60 is connected on the anode side between the choke coil 30 and the inner tapping of the converter coil 40 and also on the cathode side between the positive voltage terminal of the DC voltage source 1 and the switch 51.

During operation of the device there is a danger of an overvoltage for the switches 41, 42 if one of the switches 41 and 42 is switched through and the magnetic field in the choke coil 30 breaks down as a result of the saturation of the choke core. In this situation, an unacceptably high voltage can be formed at the inner tapping point of the autotransformer, which voltage then actually doubles by way of the autotransformer 40 at the switch 41 or 42 which is open in this situation.

The diode 60 prevents overvoltages occurring at the inner tapping point of the converter coil 40 with reference to the voltage level of the DC voltage source 1. The voltage at the inner tapping point of the converter coil is thus clamped to the voltage level of the DC voltage source 1, as a result of which overvoltages are prevented at the switches 41, 42. In addition, the energy stored in the choke coil 30 is fed into the circuit as a result.

In this situation, the inner tapping point preferably takes the form of an autotransformer midpoint.

Figure 9:
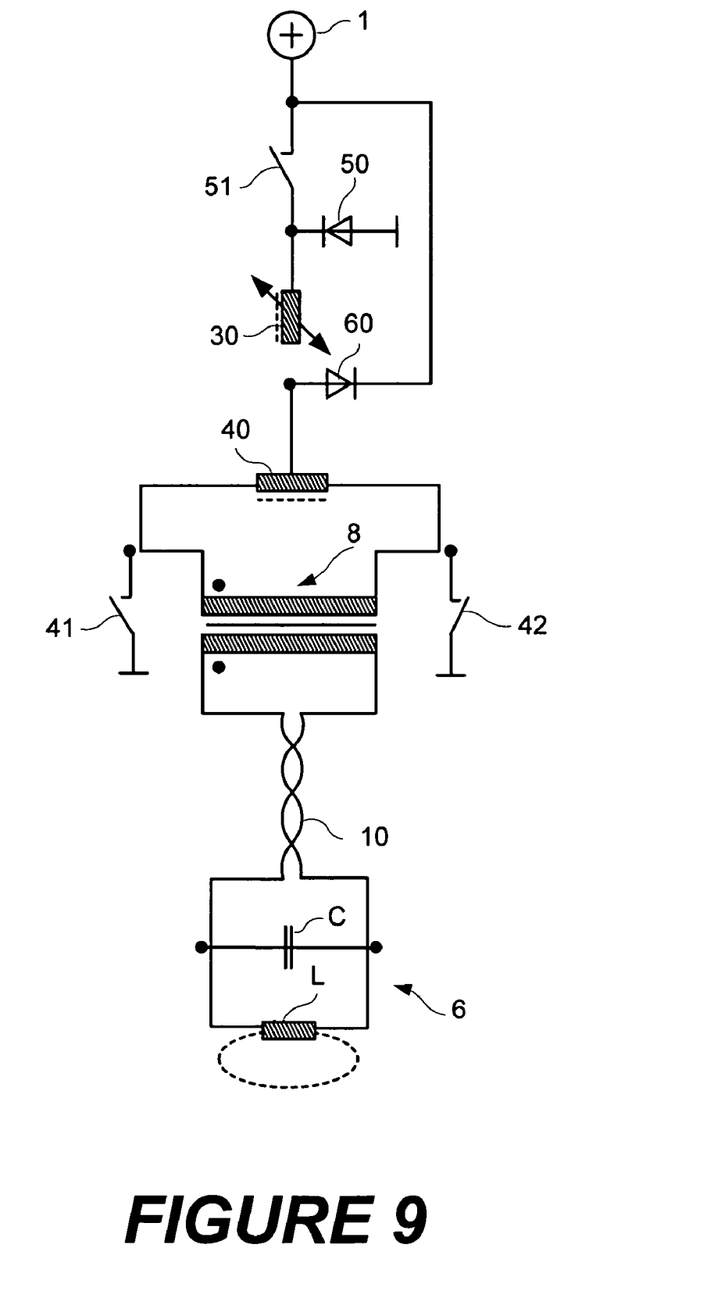
FIG. 9 shows a device for generating electromagnetic waves as a sixth embodiment of the invention.

FIG. 9 shows a device for generating electromagnetic waves according to a sixth embodiment of the invention. The device according to the sixth embodiment is identical to that of the fifth embodiment, except that it additionally contains a transformer 8.

The transformer 8 contains a primary coil which is coupled magnetically to the secondary coil. The primary coil is connected in parallel to the converter coil 40 at its outer tapping points. Furthermore, the secondary coil of the transformer 8 is connected by way of a feeder cable 10 parallel to the parallel oscillating circuit 6. In this situation, the primary coil preferably contains fewer windings than the secondary coil. As a result, the voltage applied to the parallel oscillating circuit is increased and at the same time the current flow for a particular output power is reduced.

The device according to the sixth embodiment consequently enables a reduction in the transmission losses with regard to the energy transfer from the converter coil 40 to the parallel oscillating circuit 6. The transformer 8 thus enables a spatial decoupling between the energy output at the converter coil 40 and the energy take-up at the parallel oscillating circuit 6.

In this situation, the feeder cable 10 preferably takes the form of a twisted cable.

Figure 10:
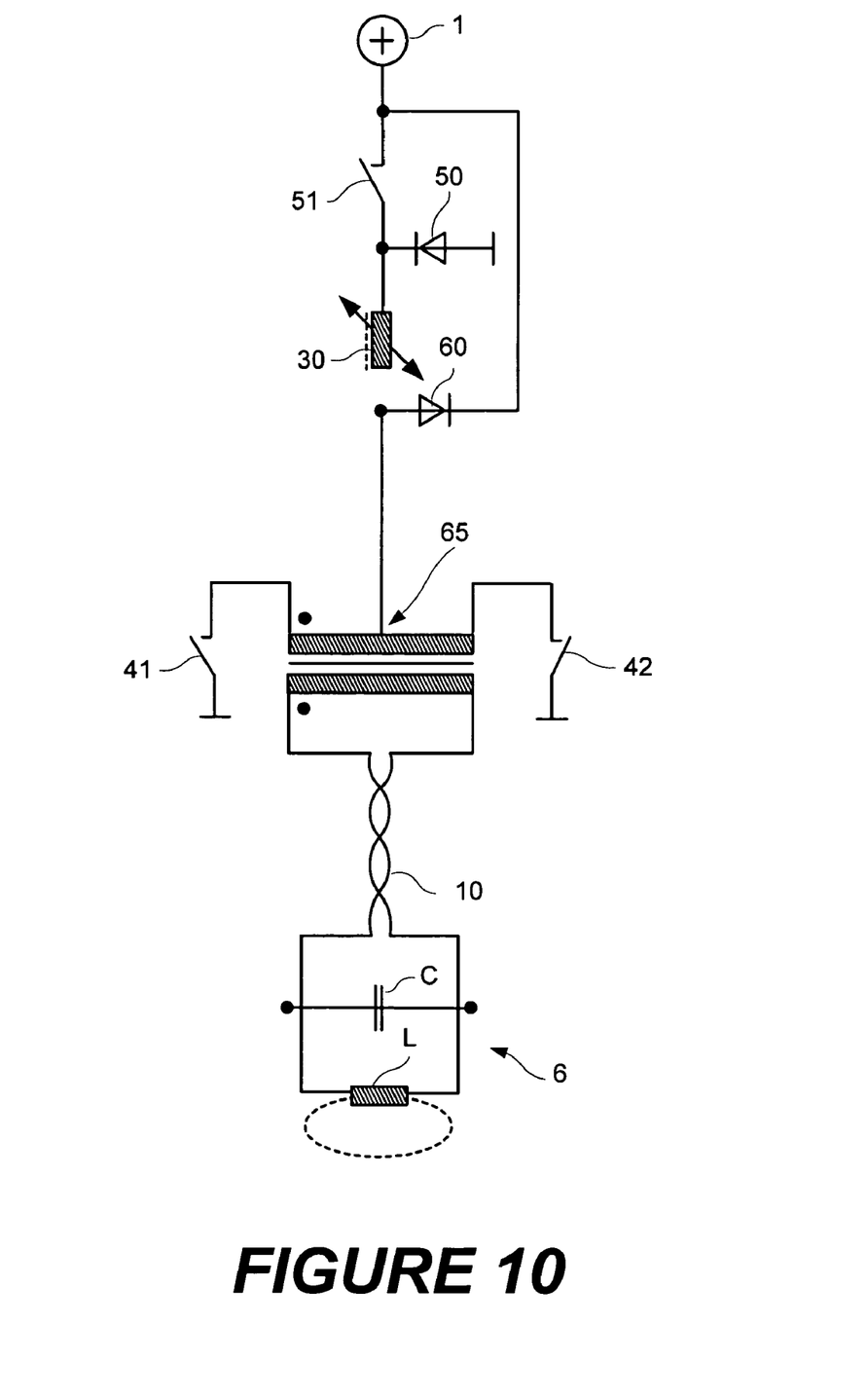
FIG. 10 shows a device for generating electromagnetic waves as a seventh embodiment of the invention.

FIG. 10 shows a further device for generating electromagnetic waves according to a seventh embodiment of the invention.

The device is largely identical to that of the sixth embodiment, except that in this case there is no autotransformer 40 and the choke 30 is connected directly to an inner tapping point of a primary coil of a voltage converter or transformer 65. Similar to the sixth embodiment, the outer tapping points of this primary coil are connected to the switches 41 and 42.

In this manner it is possible to dispense with the autotransformer according to the sixth embodiment.

By using a device according to the seventh embodiment it is possible to generate a high inductively generated output power for the oscillating circuit 6 with an optimized level of efficiency. The parallel oscillating circuit is supplied with a high voltage and low currents, for which reason the line losses are minimized in the circuit. In addition, the device according to the seventh embodiment provides a short build-up time and a short decay time for the resonant oscillation of the parallel resonance circuit 6.

With regard to the aforementioned embodiments, the voltage terminals referred to as "positive" and "negative" are mentioned only as examples. Their arrangement can naturally also be inverted. To this end, simply the switching elements having voltage-asymmetric characteristics, such as the diodes 50, 60 for example, need to have their direction of connection reversed.

By using a device according to the first and second embodiments it is possible to generate electromagnetic waves in accordance with data to be transmitted, provided that the switch or switches 2 which can be switched over between two voltages perform a switchover at a frequency which is tuned to the natural frequency of the oscillating circuit and that the transmitting coil L accordingly transmits electromagnetic waves which identify a high level state or a low level state relating to the data to be transmitted.

A possible technical implementation in terms of circuitry in accordance with a device according to the second embodiment would be for example the coupling by way of an AND gate in each case of a data signal to be transmitted with the switching clock pulses from a clock pulse generator and of a clock pulse generator inverted with respect to the other with the resonant frequency of the oscillating circuit. In this situation, the output signal from each AND gate can be used for controlling one of the switches 2. With regard to an embodiment using the device according to the first embodiment, the control of the second switch 2 is simply dispensed with.

The device according to the third embodiment can be used for generating electromagnetic waves in accordance with data to be transmitted, provided that the switches 41 and 42 perform their switching operations in each case at a frequency which is tuned to the natural frequency of the oscillating circuit and that the transmitting coil L accordingly transmits electromagnetic waves which identify a high level state or a low level state relating to the data to be transmitted.

A device of this type, using two AND gates, could be designed in a similar way to the embodiment for the second embodiment.

Figure 13:
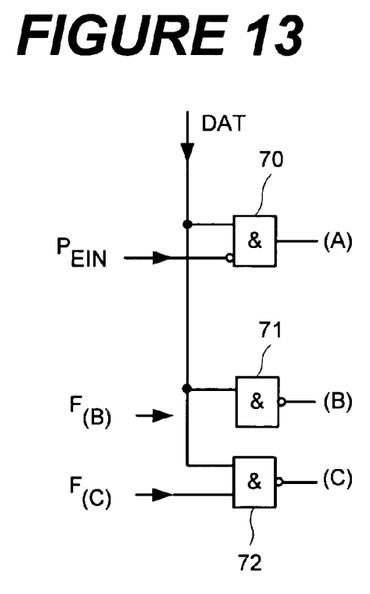
FIG. 13 shows an example of a logic gate for performing logical operations on the input signals $P_{EIN}$, $F_{(B)}$ and $F_{(C)}$ and transmission data DAT according to the invention.

FIG. 13 shows a logic circuit with which the devices according to the fourth through seventh embodiments are able to perform a modulation of electromagnetic waves which are to be generated in accordance with data to be transmitted.

Figure 11:
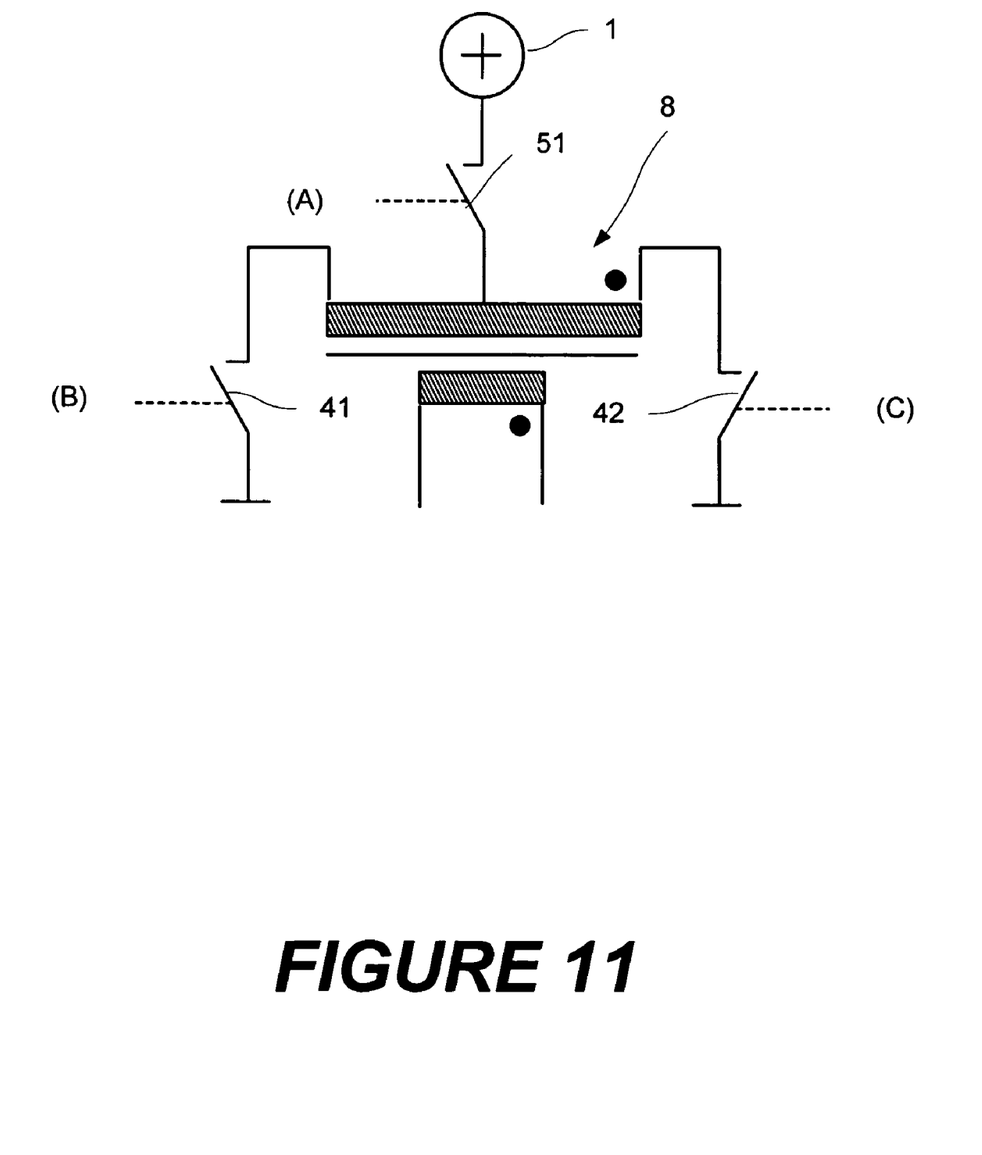
FIG. 11 shows a basic switch arrangement for the devices according to the fourth through seventh embodiments.

To this end, FIG. 11 shows the basic switch arrangement of the devices according to the fourth through seventh embodiments. In detail, an oscillation of the parallel oscillating circuit 6 is caused by the way in which the switches 51, 41 and 42 function. Further concentrated components of the device according to the fourth through seventh embodiments are omitted from FIG. 11 for the sake of improved clarity.

Figure 12:
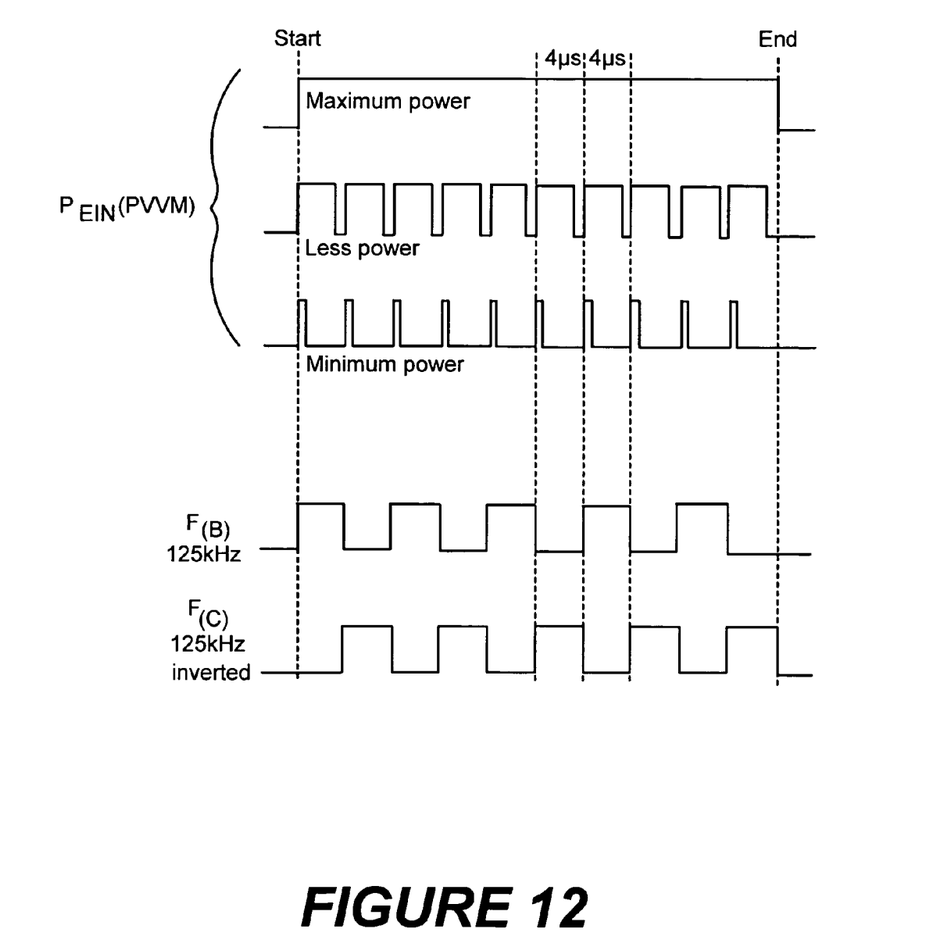
FIG. 12 shows examples of signal waveforms for the input signals $P_{EIN}$, $F_{(B)}$ and $F_{(C)}$.

In FIG. 11, (A), (B), (C) denote control signals for the respective switches 51, 41 and 42. In this situation, a low control signal (A), (B), (C) causes the respective switch 51, 41, 42 to open and a high control signal causes the switch 51, 41, 42 to close. According to a preferred embodiment, it is assumed by way of example that the resonant frequency of the parallel resonance circuit 6 is 125 kHz. A square-wave signal waveform $F_{(B)}$ and also the latter's inverted time characteristic $F_{(C)}$ are provided by a control device (not shown). In addition, a control signal $P_{EIN}$ at twice the frequency of $F_{(B)}$ or $F_{(C)}$ is provided by a control device (not shown). In this situation, the signal $P_{EIN}$ can be used for pulse width modulation. To this end, the pulse width of the signal $P_{EIN}$ is freely selectable. Examples of signal waveforms for the input signals $P_{EIN}$, $F_{(B)}$ and $F_{(C)}$ are shown in FIG. 12.

Data to be transmitted is fed in as binary data DAT to a data input device (not shown). According to the logic circuit shown in FIG. 13, the transmission data DAT is coupled with the power control signal $P_{EIN}$ by way of an AND gate 70. In addition, the signals $F_{(B)}$ and $F_{(C)}$ are each coupled by way of a NAND gate 71 and 72 with the transmission data DAT. The output from the gate 71 provides the control signal (B) and the output from the gate 72 provides the control signal (C).

Figure 14:
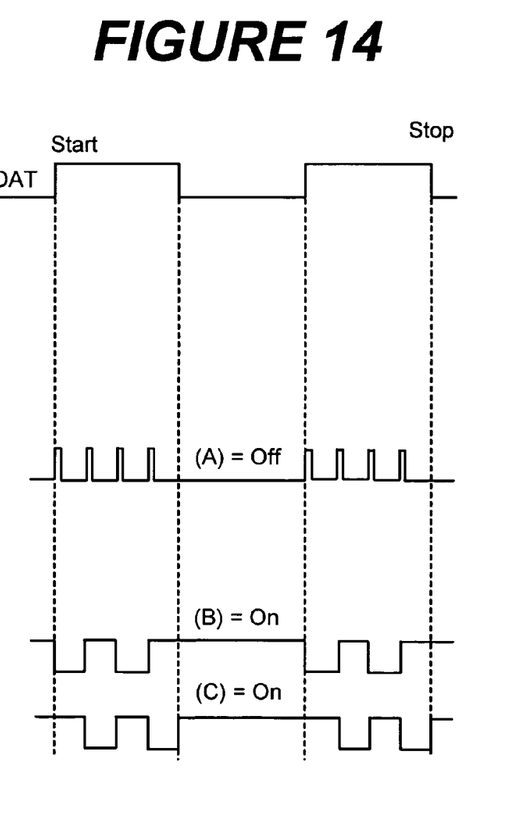
FIG. 14 shows output signal waveforms for the logic gate shown in FIG. 13.

FIG. 14 shows examples of signal waveforms for the control signals (A), (B), (C) for sample transmission data DAT.

If therefore a data signal to be transmitted exhibits a high-level state, electromagnetic waves are generated inductively in the parallel oscillating circuit 6 by the device according to the fourth through seventh embodiments. In order to identify a low-level state for a data signal to be transmitted, accordingly no electromagnetic waves are generated by the parallel oscillating circuit 6. If the data signal DAT to be transmitted thus exhibits a low level, the switches 41 and 42 are closed and the switch 51 is open, with the result that the oscillating operation of the parallel oscillating circuit is abruptly terminated and no electromagnetic waves are generated by the parallel oscillating circuit 6. In this manner, data to be sent can be transmitted by means of the electromagnetic waves generated by the devices according to the fourth through seventh embodiments with a modulation depth of 100%.

As a result of the short build-up time and short decay time for the oscillation of the parallel oscillating circuit 6 in particular of the devices according to the fourth through seventh embodiments it is furthermore possible to achieve a high bit transfer rate.

I claim:

1. A device for generating electromagnetic waves, in particular for data transfer between a motor vehicle and a data storage medium, comprising:
   an energy supply device for providing an alternating voltage;
   an oscillating circuit comprising a capacitance connected in parallel with an inductance to which the alternating voltage is applied for generating the electromagnetic waves, and
   a choke coil between at least one part of the energy supply device and the oscillating circuit.

2. The device according to claim 1, wherein the energy supply device has a terminal capable of being switched over between two voltages which is connected through the choke coil to an oscillating circuit terminal.

3. The device according to claim 2, wherein the energy supply device has a further terminal capable of being switched over between two voltages which is connected through a capacitor or a transmitting coil of the oscillating circuit to the one oscillating circuit terminal.

4. The device according to claim 1, wherein the energy supply device contains a DC voltage source, a converter coil and a first and second push-pull switches, the DC voltage source is connected by way of the choke coil to an inner tapping point of the converter coil whose outer tapping points are connected to the first and second push-pull switches, respectively which assume switching states in push-pull fashion, and the output voltage from the outer tapping points of the converter coil is applied to the oscillating circuit.

5. The device according to claim 4, wherein the converter coil is formed by an autotransformer.

6. The device according to claim 4, wherein a switch is provided between the DC voltage source and the choke coil such that in the event of simultaneous closure of the push-pull switches and opening of the switch the oscillation of the oscillating circuit decays abruptly.

7. The device according to claim 6, wherein the push-pull switches are switched in tune to the natural frequency of the oscillating circuit, the switch is switched in tune to the switching frequency of the push-pull switches and is operated with a selectable pulse width.

8. The device according to claim 6, wherein a terminal is provided between the switch and the choke coil, to which is connected a free-wheeling diode.

9. The device according to claim 4, wherein one terminal side of a diode is connected between the choke coil and the inner terminal of the converter coil and the other terminal side of the diode is connected to the DC voltage source.

10. The device according to claim 4, additionally comprising a transformer, having a primary coil and a secondary coil which are coupled magnetically, whereby the primary coil is connected to the outer tapping points of the converter coil and one output of the secondary coil is connected to the one oscillating circuit terminal and the other output of the secondary coil is connected by way of a capacitor or a transmitting coil of the oscillating circuit to the one oscillating circuit terminal.

11. The device according to claim 4, wherein the converter coil is the primary coil of a transformer, and one output of the secondary coil of the transformer, which is magnetically coupled to the primary coil, is connected to the one oscillating circuit terminal and the other output is connected by way of a capacitor or a transmitting coil of the oscillating circuit to the one oscillating circuit terminal.

12. A method for operating a device for generating electromagnetic waves comprising the steps of:
   providing an DC voltage by an energy supply device;
   applying the DC voltage to an oscillating circuit for generating the electromagnetic waves;
   coupling a choke coil between at least one part of the energy supply device and the oscillating circuit; and
   operating the choke coil in the saturation state at times during the transient condition of the oscillating circuit.

13. The method according to claim 12, wherein the step of providing the DC voltage is performed in accordance with data to be transmitted, and includes the step of switching between two voltages at a frequency tuned to the natural frequency of the oscillating circuit in order to identify a high level state or a low level state relating to the data to be transmitted.

14. A method for operating a device for generating electromagnetic waves comprising the steps of:
   providing an DC voltage by an energy supply device;
   switching the DC voltage to an inner tapping point of a converter coil;
   coupling the outer tappings of the converter coil with an oscillating circuit; wherein the switching and coupling can be performed in such a way that the oscillating circuit decays abruptly.

15. The method according to claim 14, wherein the abrupt decay can be reached by decoupling of the inner tapping point and grounding of the outer tapping point.

16. The method according to claim 14, wherein the switching closes while a particular data state obtains or is operated in tune to the natural frequency of the oscillating circuit with a selectable pulse width.

17. The method according to claim 14, wherein a pulse width of the switching is determined depending on the data to be transmitted.

* * * * *